United States Patent
Wu

(10) Patent No.: US 11,309,122 B2
(45) Date of Patent: Apr. 19, 2022

(54) WIRELESS CHARGING COIL STRUCTURE WITH FUNCTION OF HEAT DISSIPATION

(71) Applicant: HOLYGO CORPORATION, Taipei (TW)

(72) Inventor: Chien-Te Wu, Taipei (TW)

(73) Assignee: HOLYGO CORPORATION, Taipei (TW)

(*) Notice: Subject to any disclaimer, the term of this patent is extended or adjusted under 35 U.S.C. 154(b) by 401 days.

(21) Appl. No.: 16/330,063

(22) PCT Filed: Aug. 12, 2016

(86) PCT No.: PCT/CN2016/109043
§ 371 (c)(1),
(2) Date: Mar. 1, 2019

(87) PCT Pub. No.: WO2018/045651
PCT Pub. Date: Mar. 15, 2018

(65) Prior Publication Data
US 2019/0228902 A1    Jul. 25, 2019

(30) Foreign Application Priority Data
Sep. 12, 2016   (CN) .......................... 201610817059.9

(51) Int. Cl.
*H01F 27/28* (2006.01)
*H02J 50/10* (2016.01)
(Continued)

(52) U.S. Cl.
CPC ........... *H01F 27/2876* (2013.01); *H01F 5/00* (2013.01); *H01F 27/16* (2013.01); *H01F 27/18* (2013.01);
(Continued)

(58) Field of Classification Search
CPC ...... H01F 27/2876; H01F 27/16; H01F 27/18; H01F 27/2847; H01F 5/00; H01F 38/14; H02J 50/10; H02J 7/025
(Continued)

(56) References Cited

U.S. PATENT DOCUMENTS

| 7,786,385 B2 | 8/2010 | Hirose et al. | |
| 2001/0035734 A1* | 11/2001 | Koike | B60L 53/66 |
| | | | 320/109 |

(Continued)

FOREIGN PATENT DOCUMENTS

| CN | 101002290 A | | 7/2007 |
| CN | 103618394 A | * | 3/2014 |

(Continued)

*Primary Examiner* — Alfonso Perez Borroto
(74) *Attorney, Agent, or Firm* — Maschoff Brennan

(57) ABSTRACT

A wireless charging coil structure with a function of heat dissipation comprises a first connecting terminal, a second connecting terminal and a coil. The coil is disposed between the first connecting terminal and the second connecting terminal, and configured to transmit a signal between the first connecting terminal and the second connecting terminal. The coil comprises a heat-pipe segment and a transmission segment electrically and heat-conductively connected with each other. The transmission segment has a predetermined thickness, the heat-pipe segment encircles an accommodating space, and a heat-dissipating medium is disposed in the accommodating space.

9 Claims, 4 Drawing Sheets

(51) Int. Cl.
*H01F 5/00* (2006.01)
*H01F 27/16* (2006.01)
*H01F 27/18* (2006.01)
*H01F 38/14* (2006.01)
*H02J 7/02* (2016.01)

(52) U.S. Cl.
CPC ......... *H01F 27/2847* (2013.01); *H01F 38/14* (2013.01); *H02J 7/025* (2013.01); *H02J 50/10* (2016.02)

(58) Field of Classification Search
USPC .......................................................... 336/62
See application file for complete search history.

(56) References Cited

U.S. PATENT DOCUMENTS

| | | | |
|---|---|---|---|
| 2011/0303392 A1 | 12/2011 | Horiuchi et al. | |
| 2015/0076919 A1* | 3/2015 | Park ........................ | H02J 50/10 307/104 |
| 2016/0347188 A1* | 12/2016 | Nakahara ................ | H02J 50/12 |
| 2017/0063101 A1* | 3/2017 | Sultenfuss .............. | H01F 27/16 |
| 2017/0178802 A1* | 6/2017 | Yang ........................ | H02J 50/10 |
| 2017/0201114 A1* | 7/2017 | Chang ................... | H02J 7/0042 |
| 2018/0254136 A1* | 9/2018 | Ueda ....................... | H01F 27/10 |

FOREIGN PATENT DOCUMENTS

| | | |
|---|---|---|
| CN | 103618394 A | 3/2014 |
| CN | 104682525 A | 6/2015 |
| CN | 105916363 A | 8/2016 |

\* cited by examiner

WIRELESS CHARGING COIL STRUCTURE WITH FUNCTION OF HEAT DISSIPATION

CROSS-REFERENCE TO RELATED APPLICATIONS

This non-provisional application claims priority under 35 U.S.C. § 119(a) on Patent Application No(s). 201610817059.9 filed in China on Sep. 12, 2016, the entire contents of which are hereby incorporated by reference.

BACKGROUND

Technical Field

This invention relates to a wireless charging coil structure, and particularly relates to a wireless charging coil structure with a function of heat dissipation.

Related Art

Currently, a wireless charging technology that facilitates the charging of an electronic device is provided with a wireless charging coil electrically connected to the battery in a portable electronic device, so that the portable electronic device may obtain electric power through the wireless charging coil to charge the battery rather than obtain electric power provided by a power supply through an additional charger in a specific specification. In the future, the function of wireless charging must be included in each portable electronic device.

For the convenience of carrying, there is a certain limitation on the size of a portable electronic device. However, if the portable electronic device is designed to additionally have the function of wireless charging, the size of the portable electronic device should be increased to accommodate a wireless charging coil, and to avoid the heat generated by the wireless charging coil and other internal components from affecting each other.

SUMMARY

The technical problem to be solved by the present invention is to provide a wireless charging coil structure with a function of heat dissipation in accordance with the deficiencies in the prior art so as to solve the problem that the wireless charging module and a heat-dissipating module of the conventional electronic device occupy more space in the portable electronic device.

The technical problem to be solved by this invention is achieved by the following technical solutions:

This invention provides a wireless charging coil structure with a function of heat dissipation comprising a first connecting terminal, a second connecting terminal and a coil. The coil is disposed between the first connecting terminal and the second connecting terminal, and configured to transmit a signal between the first connecting terminal and the second connecting terminal. The coil comprises a heat-pipe segment and a transmission segment electrically and heat-conductively connected with each other. The transmission segment has a predetermined thickness, the heat-pipe segment encircles an accommodating space, and a heat-dissipating medium is disposed in the accommodating space.

More particularly, the heat-pipe segment comprises a bending portion, and a radius of curvature of the bending portion is between 3 times and 5 times a width of the heat-pipe segment.

More particularly, the heat-pipe segment has a predetermined length, and the predetermined length is directly proportional to a width of the heat-pipe segment.

More particularly, the predetermined length of the heat-pipe segment is less than a threshold value, and the threshold value associated with a heat-dissipation power of the heat-pipe segment.

More particularly, a plurality of notches disposed on an inner wall surface of the heat-pipe segment adjacent to the accommodating space.

More particularly, the predetermined thickness of the transmission segment is between 0.2 centimeter and 0.6 centimeter.

More particularly, the transmission segment is formed by stamping.

More particularly, the heat-pipe segment is connected with the transmission segment by soldering.

More particularly, an outer wall surface of the heat-pipe segment away from the accommodating space contacts an insulation layer, and the insulation layer and the heat-pipe segment are in an electrically insulated and heat-conductive connection.

In view of the above description, by disposing both the transmission segment and the heat-pipe segment in the coil, the wireless charging coil structure with the function of wireless charging and provided by this invention may combine the functions of wireless charging and heat dissipation, save the space for accommodating the wireless charging module and the heat-dissipating module in the conventional electronic device to increase the space inside the electronic device, so that the size of the electronic device may be reduced or other more components may be disposed in the electronic device.

The above description of the contents of this invention and the following description of the embodiments are used to demonstrate and explain the spirit and principle of the present invention, and provide a further explanation of the protection scope of this invention.

DETAILED DESCRIPTION

The detailed features and advantages of this invention are described in detail below in the embodiments, which are sufficient to enable any person having original skill in the art to understand and implement the technical contents of this invention. Based on the contents described in this specification, the claims and the accompanying drawings, the person having original skill in the art can easily understand the objects and advantages related to this present invention. The following embodiments further illustrate the concept of this invention, but do not limit the scope of the invention in any way.

First Embodiment

Figure 1:
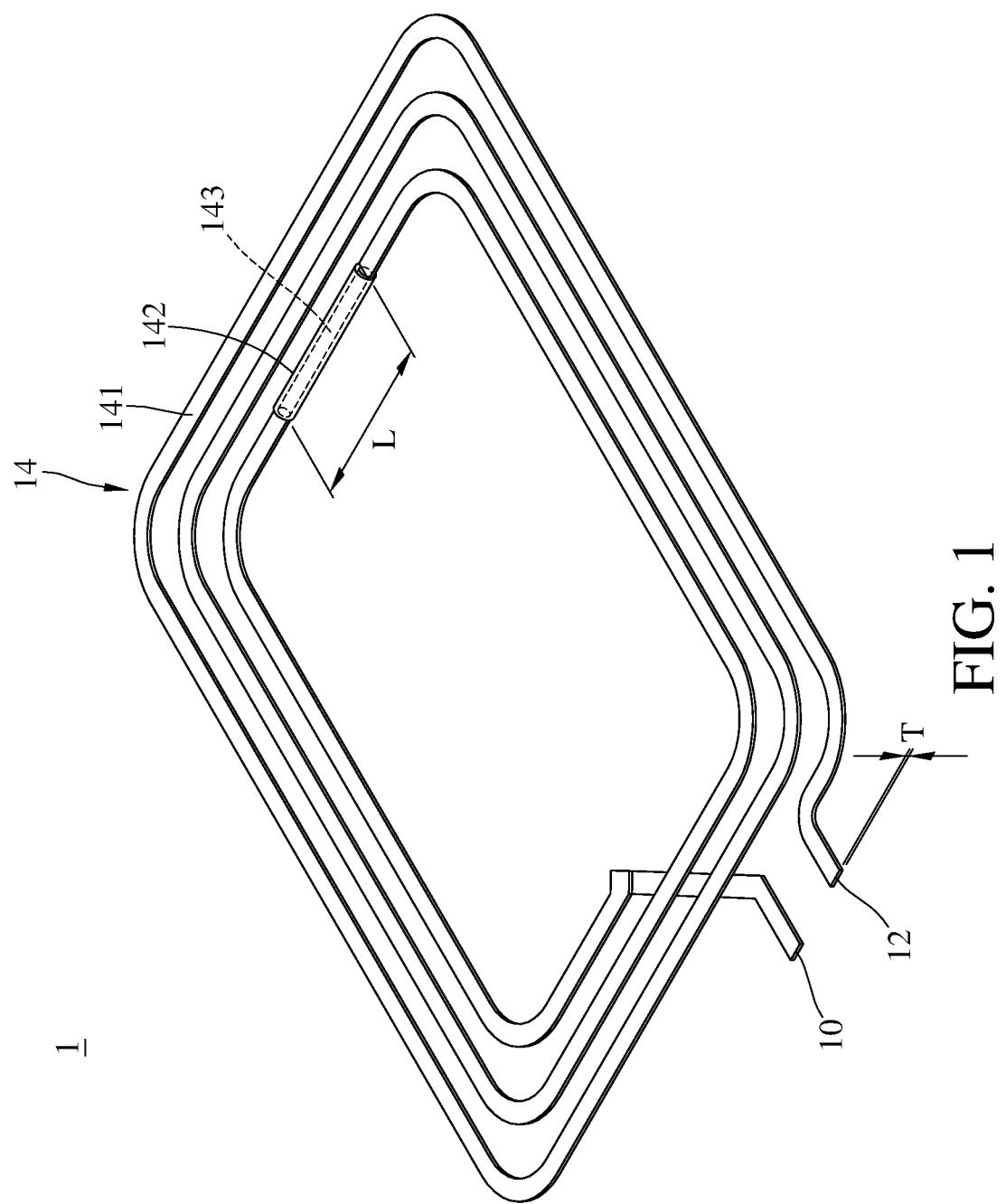
FIG. 1 is a stereogram of a wireless charging coil structure according to the first embodiment of this invention.

FIG. 1 is a stereogram of a wireless charging coil structure according to the first embodiment of this invention. As shown in FIG. 1, a wireless charging coil structure 1 comprises a first connecting terminal 10, a second connecting terminal 12 and a coil 14. For example, the wireless charging coil structure 1 is disposed in a smart phone, tablet, laptop or another appropriate kind of portable electronic device. The wireless charging coil structure 1 can be disposed at the circuit board, casing or another appropriate position of the portable electronic device. In another embodiment, the wireless charging coil structure 1 can also be disposed at a charger connected with a fixed power supply, and generate magnetic force based on the electric power supplied by the power supply so that the wireless charging coil structure disposed at the portable electronic device generates a current for charging based on the magnetic force. The person having ordinary skill in the art can apply the wireless charging coil structure 1 to any appropriate electronic device which is not limited to this embodiment. For convenience of explanation, the wireless charging coil structure 1 is exemplified to be disposed at a portable electronic device in the following embodiment, but the implementation of the wireless charging coil structure 1 is not limited to this.

The first connecting terminal 10 and the second connecting terminal 12 of the wireless charging coil structure 1 are respectively located on two ends of the coil 14, and configured to be electrically connected with the electric power chip, battery of the portable electronic device, or to electrically connect with the battery via the electric power chip. The first connecting terminal 10 and the second connecting terminal 12 are respectively and electrically connected with the positive terminal and the negative terminal of the electric power chip, and fixed by soldering, clamping, gripping or another method. When the wireless charging coil structure 1 is disposed far from the position of the electric power chip, the first connecting terminal 10 and the second connecting terminal 12 can also be extendedly connected with the electric power chip in any shape or with a bend. The person having ordinary skill in the art can design the first connecting terminal 10 and the second connecting terminal 12 based on the actual condition of the portable electronic device, which is not limited to this embodiment.

The coil 14 is configured to transmit a signal between the first connecting terminal 10 and the second connecting terminal 12. For example, when magnetic force passes through the middle of the coil 14, the current signal induced by the coil 14 reacting to the magnetic force is transmitted between the first connecting terminal 10 and the second connecting terminal 12, and transmitted to the battery of the portable electronic device via the first connecting terminal 10 and the second connecting terminal 12 for storage or to other components of the portable electronic device for supplying electricity. The coil 14 comprises a transmission segment 141 and a heat-pipe segment 142 which are electrically and heat-conductively connected with each other. In other words, the transmission segment 141 and the heat-pipe segment 142 are electrically connected with each other for transmitting the signal between the first connecting terminal 10 and the second connecting terminal 12, and the transmission segment 141 and the heat-pipe segment 142 are heat-conductively connected with each other for transferring the heat between the first connecting terminal 10 and the second connecting terminal 12. In practice, the transmission segment 141 and the heat-pipe segment 142 can be connected with each other by soldering or via a material which is electric conductive as well as heat conductive.

In this embodiment, the transmission segment 141 has a predetermined thickness T, and surrounds into a spiral. For example, the predetermined thickness T of the transmission segment 141 is between 0.2 centimeter (cm) and 0.6 cm. When the predetermined thickness T is between 0.45 cm and 0.55 cm, the resistance, inductance and capacitance of the transmission segment 141 may result in the better radiation efficiency of the transmission segment 141, which is not limited to this. In an embodiment, the transmission segment 141, the first connecting terminal 10 and the second connecting terminal 12 can be formed together by stamping, etching, laser marking or another appropriate fabrication process.

Based on the considerations of fabrication process and cost, in practice, when the thickness T of the transmission segment 141 is between 0.45 cm and 0.55 cm, the transmission segment 141, the first connecting terminal 10 and the second connecting terminal 12 can be formed by a stamping method implemented by a stamping machine. For example, the stamping machine includes a core side and a cavity side. The core side includes a bump formed based on the shapes of the transmission segment 141, the first connecting terminal 10 and the second connecting terminal 12, and the cavity side includes a cavity formed based on the shapes of the transmission segment 141, the first connecting terminal 10 and the second connecting terminal 12. A copper plate or a plate made of another appropriate material is disposed between the core side and the cavity side, and the copper plate is cut to have the predetermined shape of the combination of the transmission segment 141' the first connecting terminal 10 and the second connecting terminal 12 by pressing the bump of the core side to the cavity of the cavity side.

In the example as shown in the figure, the transmission segment 141 is processed by stamping to form a spiral structure from a straight line. In another example, the transmission segment 141 can also be processed by stamping to form a spiral structure from a wavy line, or there are convex dots disposed on the surface of the transmission segment 141 so as to adjust the resistance, inductance or capacitance of the transmission segment 141; thereby, the transmission segment 141 may have the better radiation efficiency. The person having ordinary skill in the art can design the type of the transmission segment 141 based on the actual requirements and it is not limited to this embodiment.

When the transmission segment 141 is formed by stamping, the space for disposing the heat-pipe segment 142 can be reserved and then the two ends of the heat-pipe segment 142 are soldered to the reserved space. That is, the transmission segment 141 is die-cut into two segments, and then the heat-pipe segment 142 is soldered between said two segments of the transmission segment 141. In another embodiment, the transmission segment 141 can also be cut to form a space for disposing the heat-pipe segment 142 by the processing method of cutting the transmission segment 141 after formed by stamping, and then the heat-pipe segment 142 is soldered to the space formed by cutting the transmission segment 141, which is not limited to this embodiment.

The heat-pipe segment 142 encircles an accommodating space 143, and a heat-dissipating medium is disposed in the accommodating space 143. In an embodiment, the accommodating space 143 of the heat-pipe segment 142 is pumped to be a semi-vacuum, and is filled with pure water or another appropriate heat-dissipating medium. Under the state of the semi-vacuum, the boiling point of the pure water is between 40° C. and 60° C., so that when the heat-pipe segment 142 contacts heat source with the temperature between 40° C. and 60° C., the pure water evaporates, absorbs the heat generated by the heat source, and condenses into water again after flowing to the low temperature zone in the accommodating space 143; thereby, the temperature of the heat source is decreased by the operation of this water cycle. The heat-pipe segment 142 can also absorb the heat generated by the heat source by the heat conduction of the transmission segment 141 so as to diffuse the heat generated by the heat source faster and improve the heat-dissipating result.

In practice, the heat-pipe segment 142 has a predetermined length L, and the length L of the heat-pipe segment 142 is directly proportional to the width of the heat-pipe segment 142. That is, the length L of the heat-pipe segment 142 is directly proportional to the hole diameter of the heat-pipe segment 142. In other words, the length L of the heat-pipe segment 142 is directly proportional to the size of the accommodating space 143. More specifically, the path which the vapor flows through in the pipe is longer as the hole diameter of the heat-pipe segment 142 is larger, so that the length of the heat-pipe segment 142 disposed in the coil 14 can be designed based on the hole diameter of the heat-pipe segment 142. However, the maximum of the length of the heat-pipe segment 142 is limited according to its heat-dissipation power; that is, the length of the heat-pipe segment 142 is less than a threshold value. For example, when a heat-pipe segment 142 with a length of 10 cm has the better heat-dissipating effect, the heat-pipe segment 142 with the length of 10 cm or a heat-pipe segment 142 with a length between 6 cm and 7 cm can be disposed in the coil 14, but this invention is not limited to this. Moreover, the position in the coil 14 for disposing the heat-pipe segment 142 can be set according to the position of the heat source in the portable electronic device, which is not limited to this embodiment.

More specifically, the wireless charging coil structure 1 is disposed in the portable electronic device. When the portable electronic device operates, its internal component such as central processing unit (CPU), graphics processing unit (GPU), battery or another component generates heat. Accordingly, the heat-pipe segment 142 can be disposed near the component generating the heat in order to absorb the heat and transfer the heat to the transmission segment 141, so that the transmission segment 141 and the heat-pipe segment 142 dissipate the heat generated by the portable electronic device together. When the portable electronic device is charged, portable electronic device is less used, so that the heat generated by its internal component is less. At this time, the transmission segment 141 and the heat-pipe segment 142 can be used together to react to the magnetic field to induce a charging current for charging the battery.

In other words, the transmission segment 141 and the heat-pipe segment 142 may combine the functions of wireless charging and heat dissipation with the same structure. The wireless charging module and the heat-dissipating module do not need to be separately disposed as the configuration method of the conventional electronic device so that the size of the electronic device may be decreased or more components may be disposed in the electronic device. Because the transmission segment 141 is formed by stamping, the transmission segment 141 has a predetermined thickness for the decrease of the resistance of the transmission segment 141 and the better efficiency of sensing irradiation. Therefore, when the transmission segment 141 is connected with the heat-pipe segment 142, the difference between the resistances of the transmission segment 141 and the heat-pipe segment 142 does not impact on the current transmission. In an embodiment, due to the decrease of the resistance of the transmission segment 141, the transmission segment 141 and the heat-pipe segment 142 can also be configured as the same impedance unit, in order to avoid the signal reflection occurring when a signal flows between the transmission segment 141 and the heat-pipe segment 142.

Moreover, in an embodiment, in order to avoid the skin effect occurring when a current flows through the heat-pipe segment 142 due to the hollow structure of the heat-pipe segment 142, a plurality of notches are disposed on the inner wall surface of the heat-pipe segment 142 which is adjacent to the accommodating space 143 so that the current can be evenly distributed over the cross-section of the heat-pipe segment 142 when the signal flows through the heat-pipe segment 142.

Second Embodiment

Figure 2:
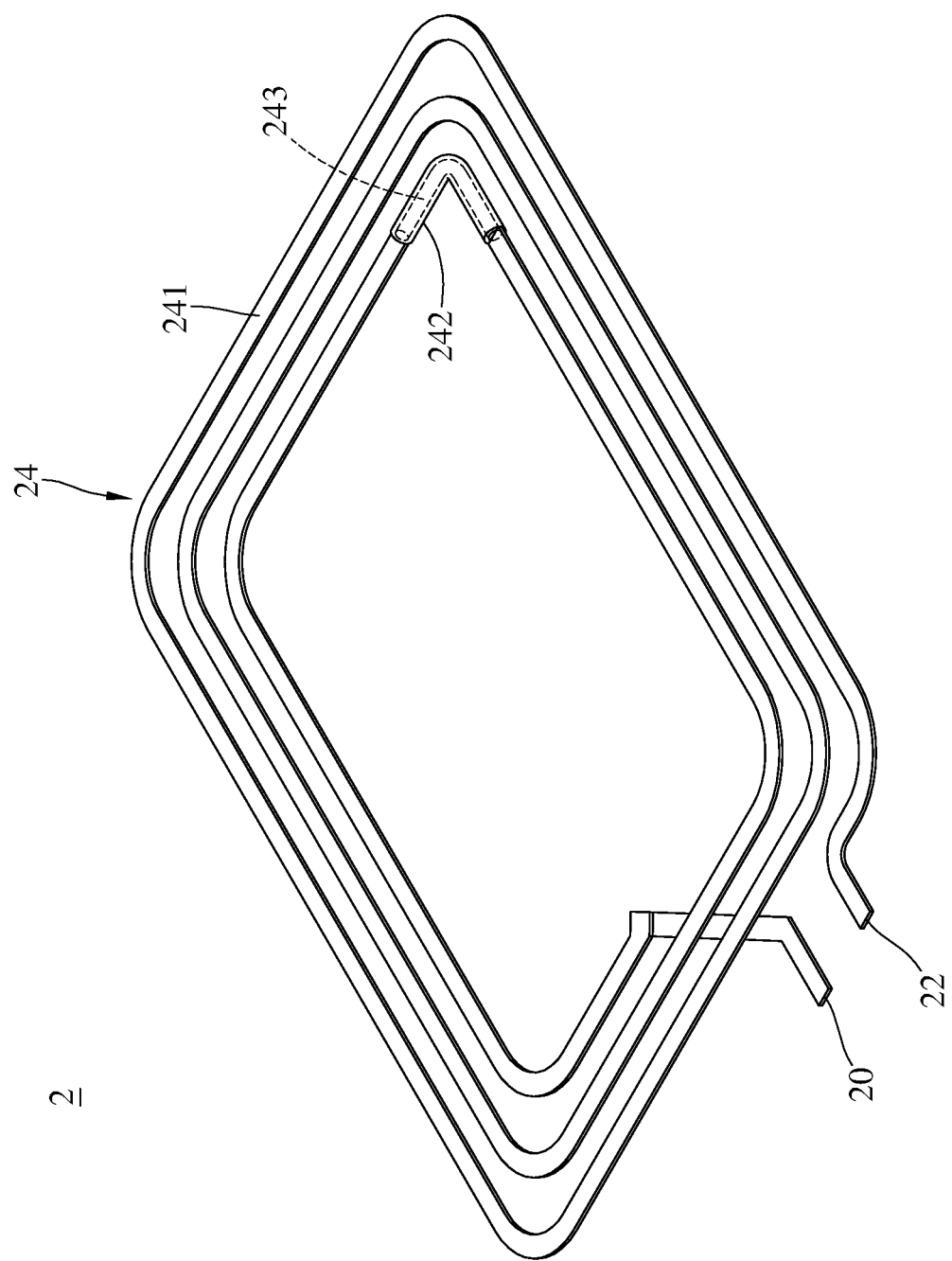
FIG. 2 is a stereogram of a wireless charging coil structure according to the second embodiment of this invention.
Figure 3:
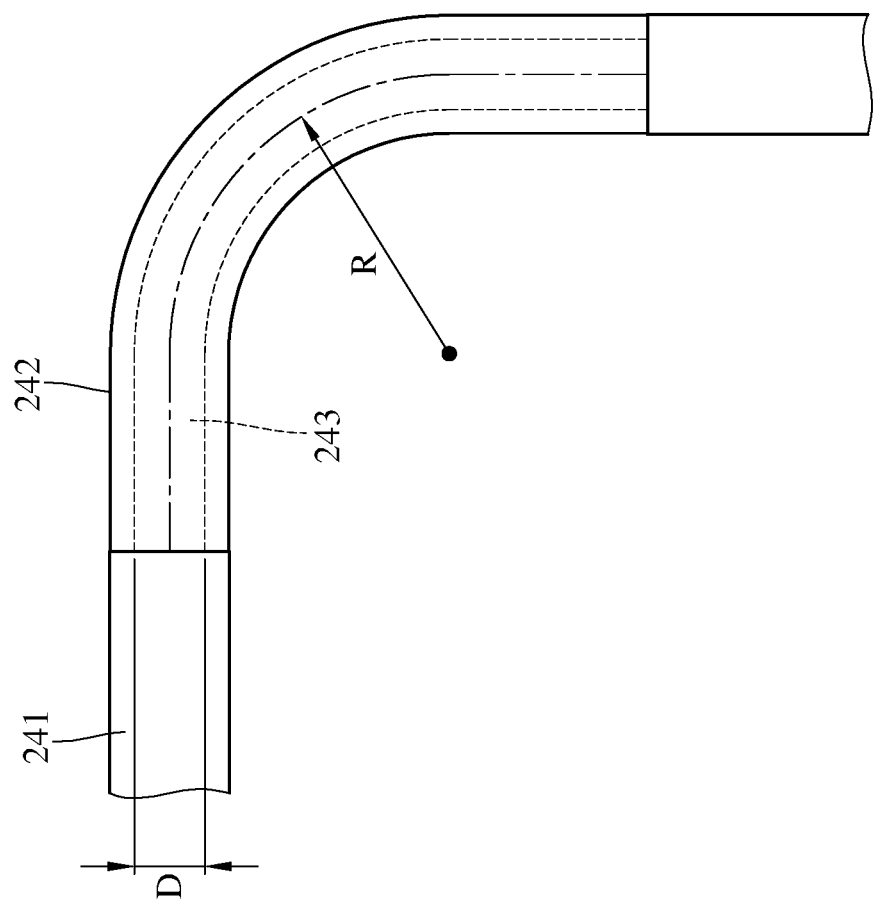
FIG. 3 is a partial enlarged view of the wireless charging coil structure in FIG. 2.

FIG. 2 is a stereogram of a wireless charging coil structure according to the second embodiment of this invention, and FIG. 3 is a partial enlarged view of the wireless charging coil structure in FIG. 2. As shown in FIGS. 2 and 3, the wireless charging coil structure 2 comprises a first connecting terminal 20, a second connecting terminal 22 and a coil 24 wherein the first connecting terminal 20 and the second connecting terminal 22 are approximately similar to those in the previous embodiment so the related details are not repeated. The coil 24 is disposed between the first connecting terminal 20 and the second connecting terminal 22, and configured to transmit the signal between the first connecting terminal 20 and the second connecting terminal 22. For example, when a magnetic force passes through the middle of the coil 24, the current signal induced by the coil 24 reacting to the magnetic force is transmitted between the first connecting terminal 20 and the second connecting terminal 22, and transmitted to the battery of the portable electronic device for storage or to other components of the portable electronic device for supplying electricity.

The coil 24 comprises a transmission segment 241 and a heat-pipe segment 242 which are electrically and heat-conductively connected with each other. The transmission segment 241 and the heat-pipe segment 242 are electrically connected with each other for transmitting the signal between the first connecting terminal 20 and the second connecting terminal 22, and heat-conductively connected with each other for transferring the heat between the first connecting terminal 20 and the second connecting terminal 22. The transmission segment 241 is formed by stamping to have a default thickness and wind in a spiral type. The heat-pipe segment 242 and the transmission segment 241 are connected with each other. The position of the connection is set according to the position of the heat source in the portable electronic device.

In this embodiment, the heat-pipe segment 242 is disposed at the bending part of the coil 24, so that heat-pipe segment 242 has a bending portion and two ends for connecting with transmission segment 241; thereby, the coil 24 may maintain the spiral shape. The radius of curvature R of the heat-pipe segment 242 is between 3 times and 5 times the width of the heat-pipe segment (i.e. between 3 times and 5 times the hole diameter D of the heat-pipe segment 242). When the radius of curvature R is between 3.5 times and 4.5 times the hole diameter D of the heat-pipe segment 242, the heat-pipe segment 242 has the better heat-dissipating effect.

More specifically, the heat-pipe segment 242 encircles the accommodating space 243, and the accommodating space 243 is pumped to be a semi-vacuum and is filled with pure water or another appropriate heat-dissipating medium. Regarding the pure water, the boiling point of the pure water is between 40° C. and 60° C. under the state of the semi-vacuum. When the pure water in the accommodating space 243 contacts the heat source with the temperature between 40° C. and 60° C., the pure water absorbs the heat generated by the heat source so as to evaporate, and flows to the low temperature zone in the accommodating space 143. When the heat-pipe segment 242 is designed to has a bending portion, the radius of curvature R is between 3.5 times and 4.5 times the hole diameter D of the heat-pipe segment 242 so as to provide an appropriate flow distance for the pure water to flow to the low temperature zone to condense into liquid, and then to flow back to the heat source. The temperature of the heat source may be reduced by the water cycle.

Third Embodiment

Figure 4:
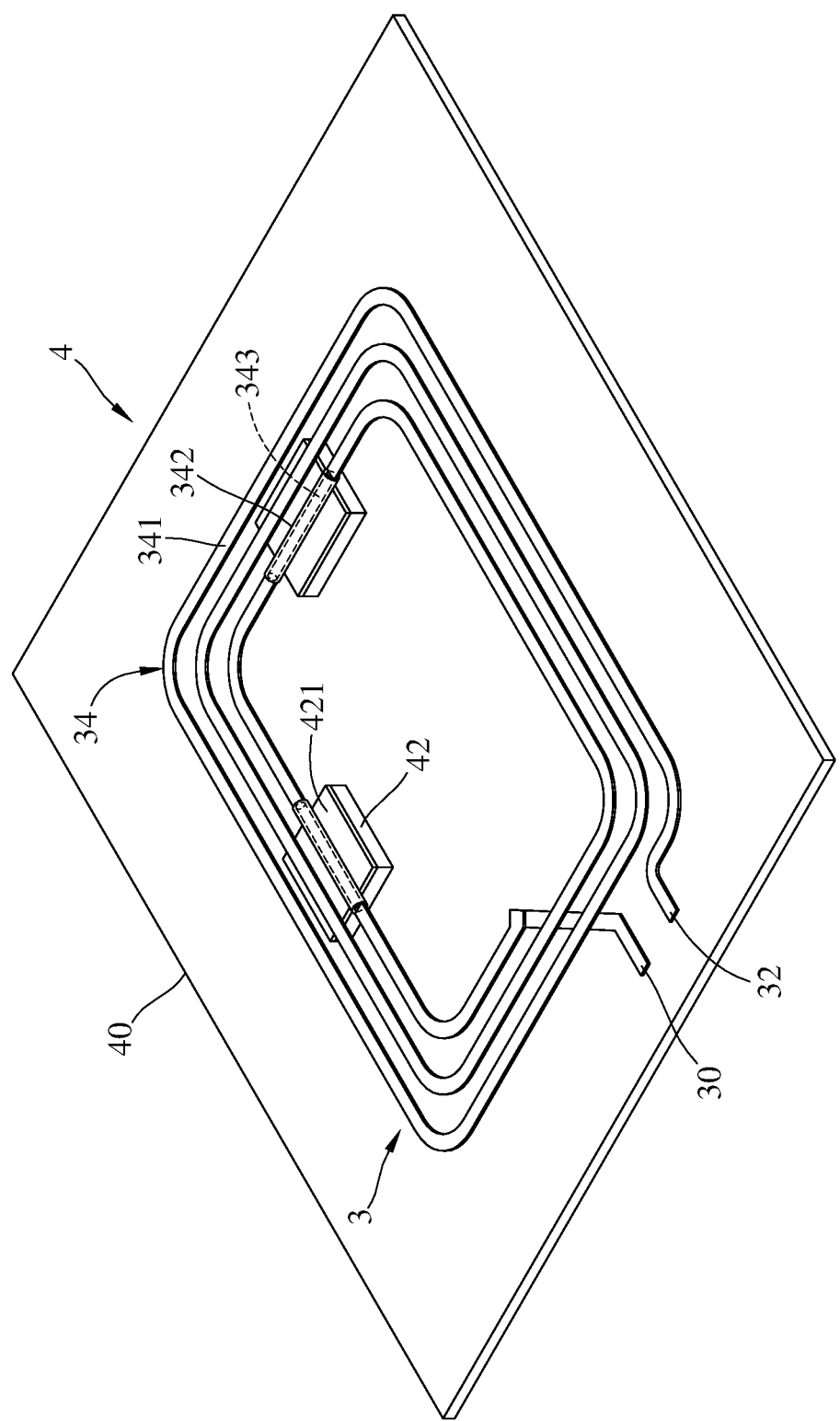
FIG. 4 is a schematic diagram of the use of a wireless charging coil structure according to the third embodiment of this invention.

In order to more clearly explain the relation between the positions of the transmission segment and the heat-pipe segment in the coil, FIG. 4 shows a schematic diagram of the use of a wireless charging coil structure according to the third embodiment of this invention. As shown in FIG. 4, the wireless charging coil structure 3 is disposed on the circuit board 40 of the portable electronic device 4, for example. There are a number of components (e.g. chip 42) disposed on the circuit board 40. The wireless charging coil structure 3 comprises a first connecting terminal 30, a second connecting terminal 32 and a coil 34 wherein the first connecting terminal 30 and the second connecting terminal 32 are configured to be electrically connected with the battery of the portable electronic device. The coil 34 is disposed between the first connecting terminal 30 and the second connecting terminal 32, and configured to transmit the signal (e.g. current signal induced by reacting to a magnetic force) between the first connecting terminal 30 and the second connecting terminal 32.

The coil 34 comprises a transmission segment 341 and a heat-pipe segment 342 which are electrically and heat-conductively connected with each other. The transmission segment 341 and the heat-pipe segment 342 are electrically connected with each other for transmitting the signal between the first connecting terminal 30 and the second connecting terminal 32, and heat-conductively connected with each other for transferring the heat between the first connecting terminal 30 and the second connecting terminal 32. The transmission segment 341 is formed by stamping to have a default thickness and wind in a spiral type. The heat-pipe segment 342 and the transmission segment 341 are connected with each other. The position of the connection is set according to the position of the chip 42.

In the embodiment of the figure, the coil 34 comprises two heat-pipe segments 342 which are disposed respectively according to the positions of the chips 42 for absorbing the heat emitted by the chips 42, and the heat dissipation area is increased by the disposition of the transmission segment 341. In an embodiment, there is an insulation layer 421 disposed between the chip 42 and the heat-pipe segment 342. That is, the outer wall surface of the heat-pipe segment 342 which is away from the accommodating space 343 contacts the insulation layer 421 so as to electrically insulate the heat-pipe segment 342 from the chip 42, and transfer the heat from the chip 42 to the heat-pipe segment 342. In other words, the insulation layer 421 and the heat-pipe segment 342 are in an electrically insulated and heat-conductive connection. For example, the insulation layer 421 is heat conductive glue or another appropriate component, which is not limited to this.

In view of the above description, one or more embodiments of this invention provide a wireless charging coil structure with a function of heat dissipation which can be disposed in any kind of electronic device. When the electronic device is operated and the internal components generate heat, the heat-pipe segment absorbs the heat from the components and transmits it to the transmission segment. The heat dissipation of the electronic device is performed by both the transmission segment and the heat-pipe segment. When the electronic device is charged, the heat generated by its components is less, so that both the transmission segment and the heat-pipe segment can be used together to transmit a current for generating a magnetic field or for reacting to the magnetic field to induce a charging current. In other words, by disposing both the transmission segment and the heat-pipe segment in the coil, the wireless charging coil structure may combine the functions of wireless charging and heat dissipation, save the space for accommodating the wireless charging module and the heat-dissipating module in the conventional electronic device to increase the space inside the electronic device, so that the size of the electronic device may be reduced or other more components may be disposed in the electronic device

What is claimed is:

1. A wireless charging coil structure with a function of heat dissipation, characterized in comprising:
    a first connecting terminal and a second connecting terminal; and
    a coil disposed between the first connecting terminal and the second connecting terminal and configured to transmit a signal between the first connecting terminal and the second connecting terminal, with the coil comprising a heat-pipe segment and a transmission segment electrically and heat-conductively connected with each other, the transmission segment, having a predetermined thickness, and the heat-pipe segment encircling an accommodating space, and a heat-dissipating medium disposed in the accommodating space,
    wherein a length of the transmission segment is longer than a length of the heat-pipe segment.

2. The wireless charging coil structure with the function of the heat dissipation according to claim 1, characterized in that the heat-pipe segment comprises a bending portion, and a radius of curvature of the bending portion is between 3 times and 5 times a width of the heat-pipe segment.

3. The wireless charging coil structure with the function of heat dissipation according to claim 1, characterized in that the heat-pipe segment has a predetermined length, and the predetermined length is directly proportional to a width of the heat-pipe segment.

4. The wireless charging coil structure with the function of heat dissipation according to claim 3, characterized in that the predetermined length of the heat-pipe segment is less than a threshold value, and the threshold value is associated with a heat-dissipation power of the heat-pipe segment.

5. The wireless charging coil structure with the function of heat dissipation according to claim 1, characterized in that a plurality of notches is disposed on an inner wall surface of the heat-pipe segment adjacent to the accommodating space.

6. The wireless charging coil structure with the function of heat dissipation according to claim 1, characterized in that the predetermined thickness of the transmission segment is between 0.2 centimeter and 0.6 centimeter.

7. The wireless charging coil structure with the function of heat dissipation according to claim 1, characterized in that the transmission segment is formed by stamping.

8. The wireless charging coil structure with the function of heat dissipation according to claim 1, characterized in that the heat-pipe segment is connected with the transmission segment by soldering.

9. The wireless charging coil structure with the function of heat dissipation according to claim 1, characterized in that an outer wall surface of the heat-pipe segment away from the accommodating space contacts an insulation layer, and the insulation layer and the heat-pipe segment are in an electrically insulated and heat-conductive connection.

* * * * *